United States Patent [19]

Touborg

[11] Patent Number: 4,822,574
[45] Date of Patent: Apr. 18, 1989

[54] GAS SUSPENSION REACTOR

[75] Inventor: Jorn Touborg, Copenhagen, Denmark

[73] Assignee: F. L. Smidth & Co. A/S, Copenhagen, Denmark

[21] Appl. No.: 115,570

[22] Filed: Oct. 29, 1987

Related U.S. Application Data

[63] Continuation of Ser. No. 879,159, Jun. 26, 1986, abandoned.

[30] Foreign Application Priority Data

Jul. 9, 1985 [GB] United Kingdom ............... 8517335

[51] Int. Cl.⁴ .................. B01J 8/08; F27B 15/00
[52] U.S. Cl. .................... 422/228; 34/57 A; 366/337; 422/232; 432/58
[58] Field of Search ............ 422/139, 145, 147, 228, 422/232, 233, 214, 213; 34/57 A, 57 E, 57 R; 55/456, 457, 462; 432/58; 406/92, 136, 137, 163, 168; 366/336–338; 241/39, 52

[56] References Cited

U.S. PATENT DOCUMENTS

| | | | |
|---|---|---|---|
| 2,435,927 | 2/1948 | Manning et al. | 241/39 |
| 2,581,134 | 1/1952 | Odell | 422/139 |
| 3,219,420 | 11/1965 | Dielenberg | 422/145 |
| 3,353,925 | 11/1967 | Baumann et al. | 422/214 |
| 4,161,917 | 7/1979 | Jubb | 422/145 |
| 4,382,065 | 5/1983 | Shiga et al. | 422/147 |
| 4,579,288 | 4/1986 | McDermid et al. | 241/52 |

*Primary Examiner*—Joye Woodard
*Attorney, Agent, or Firm*—Brumbaugh, Graves, Donohue & Raymond

[57] ABSTRACT

A tubular reactor for heat treatment of granular material in suspension has a vessel (1) up through which a flow of gas and burning fuel passes. The vessel contains vanes (20) which cause the gas to follow a helical path and fling outwards entrained material, which falls down the vessel wall and is displaced inwardly by frusto-conical rings (30).

6 Claims, 4 Drawing Sheets

GAS SUSPENSION REACTOR

This application is a continuation of application Ser. No. 879,159, filed on 6/26/86 now abandoned.

BACKGROUND AND SUMMARY OF THE INVENTION

The invention relates to a gas suspension reactor, hereinafter referred to as of the kind described, comprising a substantially cylindrical vessel mounted with its axis substantially vertical and with a downwardly and inwardly sloping bottom wall, means for introducing granular material to be treated and fuel into the vessel adjacent to the bottom wall, and means for introducing a jet of gas into the vessel centrally up through the bottom wall for reaction with the material and/or for burning out the fuel, and for suspension of the material.

As the time of introduction into the reactor vessel the gas velocity is high, typically 20–35 m/sec, while the average gas velocity through the vessel cross-section typically is lower by a factor of 10. However, the gas velocity is not constant across the vessel cross-section as near the center it is much higher than the average gas velocity and along the vessel wall it is lower than this average. Near the wall the gas velocity is lower than the velocity of fall of the material particles. Consequently, material particles flow back along the wall to the vessel bottom where the particles are reentrained by the central gas jet. By this internal material circulation the material retention time in the reactor is prolonged to 4–5 times the gas through-flow time through the reactor.

In a reactor of reasonable height, retention times of between 5 sec. and ½ min. may be obtained, this being sufficient for e.g. calcining calcium carbonate in cement raw materials.

In other processes such as calcining of phosphate, or reduction of iron ore, considerably longer retention times in the range 3–5 min. are required.

Consequently it is the object of the invention to provide a gas suspension reactor with prolonged material retention time.

The object is achieved by a reactor of the kind described which, according to the invention, is characterized in that, interspersed at intervals up along the inside of the vessel there are mounted means for making the material entraining gas flow through the vessel rotate about the vessel axis so that the gas flow follows a helical path, and means for causing material falling down along the vessel walls to be displaced inwardly towards the vessel axis.

By the rotating movement, the material is flung towards the cylindrical vessel wall where it is stopped and falls down along the wall towards the vessel bottom. By thus increasing the material circulation inside the reactor the average material retention time is prolonged, but this step alone would cause an undesirably large material concentration at the vessel bottom simultaneously with extensive back-mixing, i.e. mixing of almost finish treated material with fresh untreated material.

This is counteracted by the means displacing the material falling along the vessel wall inwards towards the vessel axis where it is resuspended in the rapid gas flow prevailing in that area. Such means are mounted at intervals up through the vessel, and material which has passed such means in the upward direction, i.e. entrained by the gas flow, will only be able to pass to a small extent the same means in the downward direction, i.e. falling along the vessel wall. In this way the unwanted high material concentration at the vessel bottom is replaced by a number of minor local material concentrations dispersed over the length of the vessel.

According to a preferred arrangement, the means creating the rotation of the material entraining gas flow about the vessel axis are guide vane fittings projecting inwardly from the vessel wall. This rotation may, if desired, be supplemented in other ways, e.g. through blowing in an auxiliary gas flow in a direction with a component tangential to the vessel wall.

Further, according to a preferred construction, the means for displacing the material falling down along the wall of the vessel towards the axis of the vessel are rings or other annular fittings, each having a frusto-conical surface sloping inwards and downwards with the conical apex substantially in the vessel axis. The outer diameter of the frusto-conical surface may correspond to the inner diameter of the vessel and the angle between the axis of the vessel and the frusto-conical surface may be no greater than 30°.

The invention will now be explained in more detail with reference to the accompanying drawings, in which:

DETAILED DESCRIPTION OF THE PREFERRED EMBODIMENTS

Figure 1:
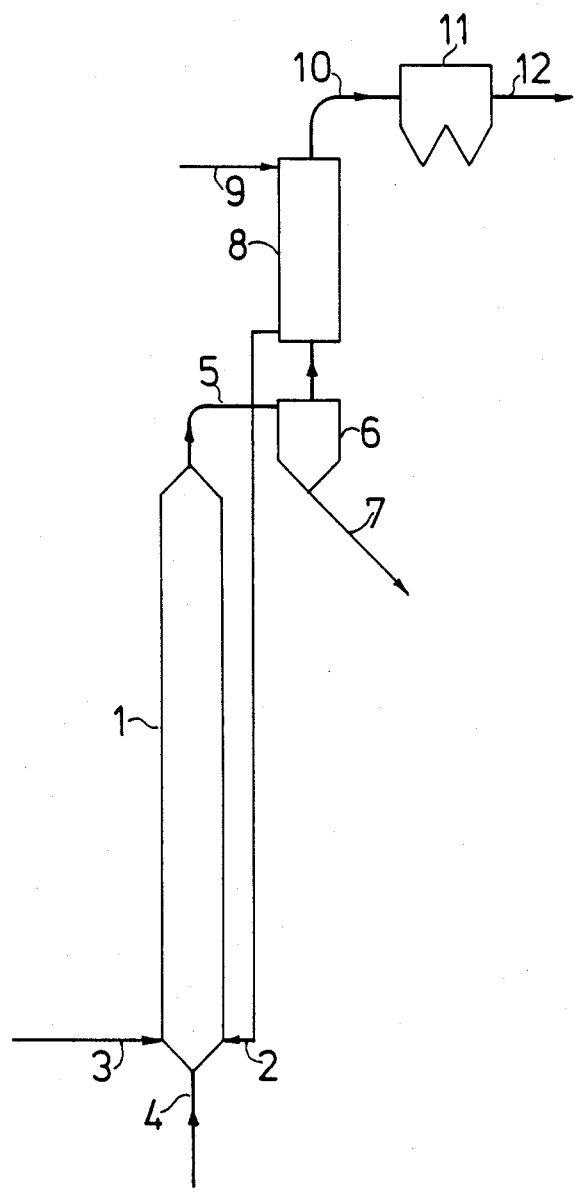
FIG. 1 diagrammatically shows a material treatment plant with a gas suspension reactor.

In the plant shown in FIG. 1, the material is treated in a reactor vessel 1 to the bottom of which preheated material is fed through a pipe 2. Fuel for the treatment is fed to the bottom of the vessel at an inlet 3 and air for combustion of the fuel and/or combustibles in the material is fed to a central inlet in the vessel bottom through a pipe 4. The reactor exhaust gas entraining the treated material is led through an outlet pipe 5 to a cyclone 6 wherein the treated material is precipitated and discharged through a material outlet 7 of the cyclone 6.

From the cyclone 6 the exhaust gas passes through a preheater 8, which is shown schematically as a block representing for instance a number of cyclones coupled in series.

The raw material is fed to the preheater 8 through an inlet 9, and the gas leaving the preheater through an outlet 10 is led to a precipitator 11 before it is discharged through a pipe 12 into the atmosphere.

Figure 2:
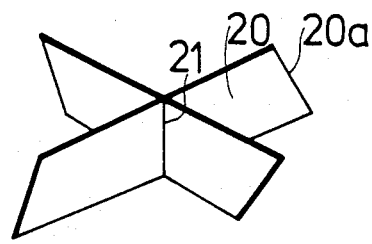
FIG. 2 shows a diagrammatic perspective of guide vane means for fitting into a reactor vessel.

The guide vane means shown in FIG. 2 consist of four comparatively thin vanes 20 joined along a vertical line 21 which, when the means are mounted in the vessel, lies in the vessel axis. The vanes are twisted like a propeller, the outer edges 20a of the vanes being inclined 45° away from a vertical position.

The guide vanes are made from, or coated with, heat-resistant material. Although four vanes are shown, more or less than four vanes may be used, and further the central part of the vanes, which is almost parallel with the vessel axis and which consequently does not significantly affect the gas flow in a tangential direction, can be left out so that the guide vanes take the shape of oblique blades mounted on the inner wall of the vessel.

Figure 3:
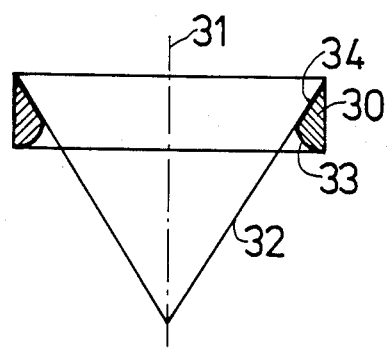
FIG. 3 shows a sectional view of a ring for fitting into a similar reactor vessel.

FIG. 3 shows a ring for fitting into the vessel. The ring 30, having an axis shown as the dash-dotted line 31, is designed to be built into the vessel with its axis coinciding with the vessel axis. The outer diameter of the ring corresponds to the inner diameter of the vessel, and the upper surface of the ring is frusto-conical and narrow downwards along an imaginary cone 32 having its apex in the axis. As the ring is intended to be passed by gas coming from below, its lower surface 33 is rounded for reducing the obstruction to flow.

Figure 4:
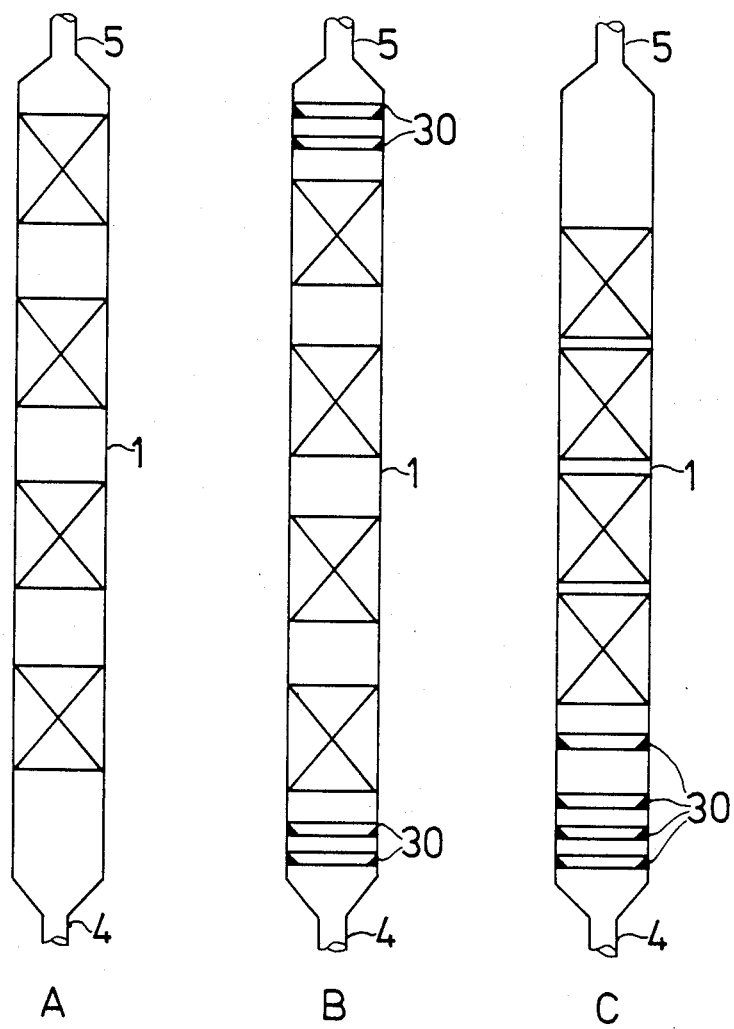
FIG. 4 shows three examples of a reactor vessel with diagrammatic indication of possible positions of sections with internal fittings; and, FIG. 5 shows three examples of a reactor vessel section indicating diagrammatically the placing of guide vane and annular internal fittings.

FIG. 4 shows how vessel sections containing a number of guide vanes and rings may be positioned internally along the reactor, the sections being marked by an "X". The distribution of rings and vanes may be the same within each section or it may vary from one section to another.

The sections in example A are positioned at equal intervals in the vessel. In example B there are mounted at the top and bottom two additional rings 30 to ensure, firstly, that material reaching the vessel top is retained in suspension so as to leave the vessel through its outlet 5, and, secondly, that the material at the vessel bottom is retained in suspension so as not to fall down into the gas inlet 4.

In example C a large number of rings at the bottom of the vessel ensures a diminished material load near the vessel bottom, while at the top of the vessel a space is left open without internal fittings.

The way in which the guide vanes 20 alternate with the rings 30 is decisive for the material distribution in the section in question.

Figure 5:
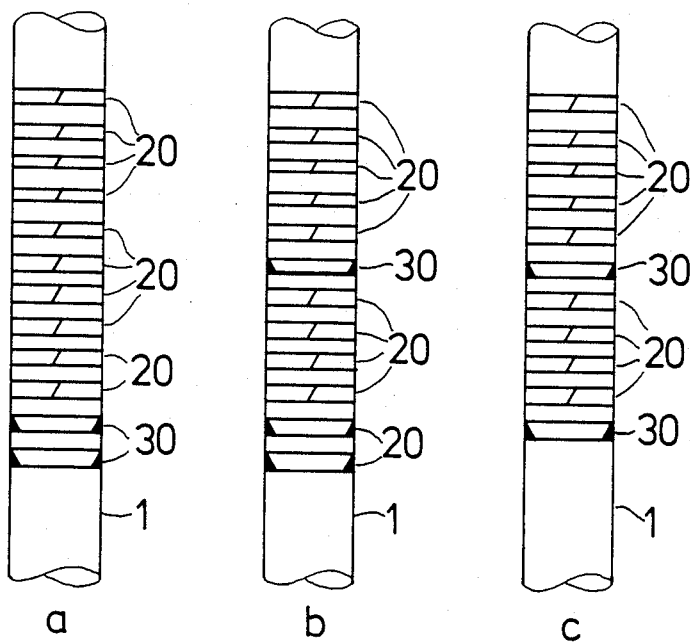

In the example a of a vessel section shown in FIG. 5, the double ring 30 at the bottom of the section ensures that material introduced into this section only passes to a very small extent down through the bottom of the section while each subsequent guide vane 20 will set the material entraining gas into still more intense rotation whereby the material is flung against the inner walls of the vessel to be precipitated and fall downwards along the wall until it meets a ring which forces it into the upgoing gas flow again. The configuration with two rings at the bottom and a number of vanes further up through the section will create a material distribution with decreasing material concentration up through the section.

With the configuration according to example b of FIG. 5 a ring 30 is inserted between the guide vanes 20 midway up through the section and a local material concentration will occur at this ring.

The section shown in example c of FIG. 5 differs from the one shown in example b in having only one ring 30 at its bottom. This example may be used if some back flow of the heavier material particles to the subjacent part of the vessel is wanted.

The distribution of rings and guide vanes within a section is not limited to the examples shown, but can be chosen freely to achieve a desired material distribution within the section. Similarly, rings and guide vanes may be positioned freely in the vessel without being arranged in sections.

I claim:

1. A gas suspension reactor comprising a substantially cylindrical vessel having substantially cylindrical side walls defining an inner diameter and mounted with the longitudinal axis thereof substantially vertical, said reactor having at least one predetermined section within the cylindrical vessel defined by the side walls and only a port of the vertical length of the side walls of the vessel, a downwardly and inwardly sloping bottom wall, means for introducing granular material to be treated and fuel into said vessel adjacent to said bottom wall, means for introducing a gas into said vessel centrally up through said bottom wall for reaction with said material, for burning out said fuel and for suspension of said material, and means for withdrawing said gas and said material from an upper portion of the reactor; wherein interspersed at invervals along the vertical length of said vessel there are first means mounted on and projecting inwardly from the vessel side walls for making said gas rotate about said longitudinal axis whereby said gas follows an upward helical path and at least a portion of the material entrained in said gas is passed radially outwardly toward the side walls and thereafter down along the side walls, and second means mounted on and projecting inwardly from the vessel side walls in said at least one predetermined section for causing material falling down along the side walls of said vessel to be displaced inwardly towards said longitudinal axis, said first means being so positioned as to cause at least a portion of said material to be passed radially outwardly toward the side walls of said vessel about said at least one predetermined section and thereafter down along said side walls to said second means, and said section means being so positioned as to cause the material falling down said side walls to be displaced inwardly so as to be entrained in said gas whereby concentration and retention time of the material within the reactor is varied in a controlled manner throughout the vertical length of the vessel by increasing the material concentration and retention time within said at least one predetermined section as compared to the concentration and retention time in other portions of the reactor not having the second means mounted therein.

2. A reactor according to claim 1 wherein said first means comprise guide vane fittings.

3. A reactor according to claim 1, wherein said second means comprise annular fittings, each having a truncated frusto-conical surface sloping inwards and downwards along an imaginary cone having its conical apex substantially in said longitudinal axis.

4. A reactor according to claim 3, wherein the largest diameter of said frusto-conical surface corresponds to the inner diameter of said vessel, and the angle between said axis of said vessel and said conical surface is no greater than 30°.

5. A reactor according to claim 1 including a plurality of said predetermined sections, at least one of said plurality of sections being separated from at least one other predetermined section by a portion of the reactor wherein there is no said second means mounted therein and wherein the material concentration and retention time is lessened as compared to the concentration and retention time in said predetermined sections.

6. A reactor according to claim 1 wherein said first and second means are positioned so as to cause backmixing of the material in the predetermined section without substantial passage of the material downwardly from said predetermined section into lower portions of the reactor.

* * * * *